Oct. 6, 1925.

M. CHICK

BUMPER

Filed Nov. 22, 1924     2 Sheets-Sheet 1

1,556,490

Martin Chick INVENTOR

BY Victor J. Evans ATTORNEY

Oct. 6, 1925.
M. CHICK
BUMPER
Filed Nov. 22, 1924    2 Sheets-Sheet 2
1,556,490
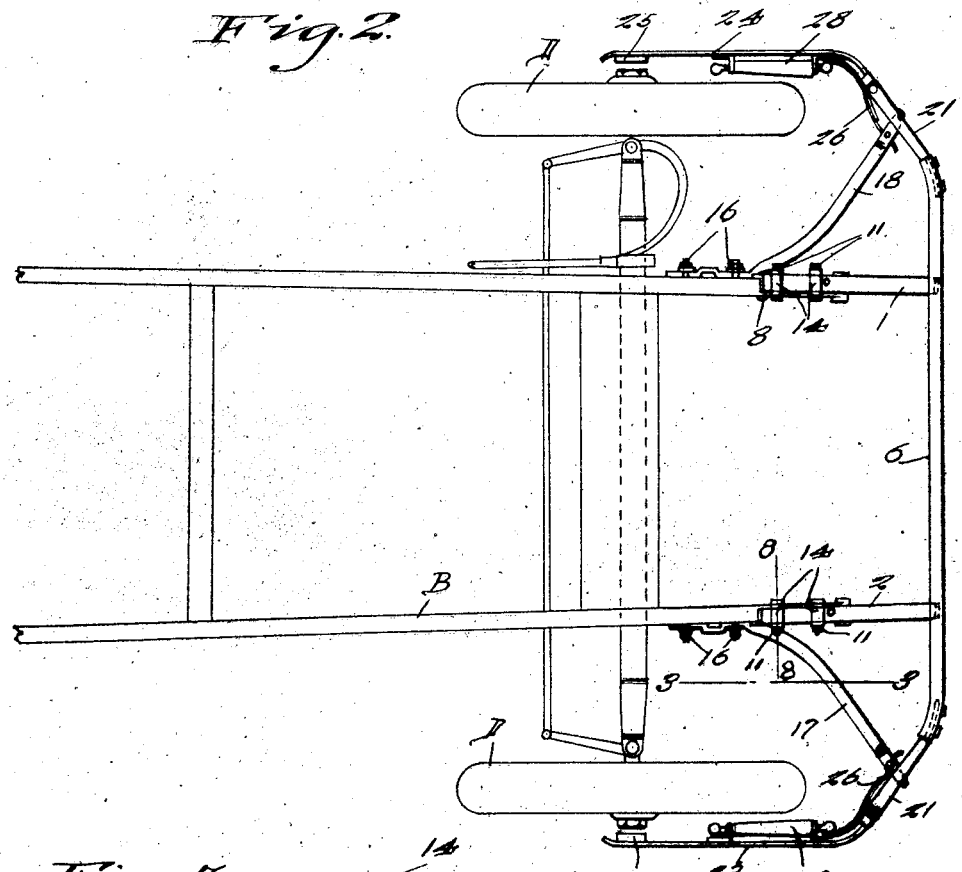
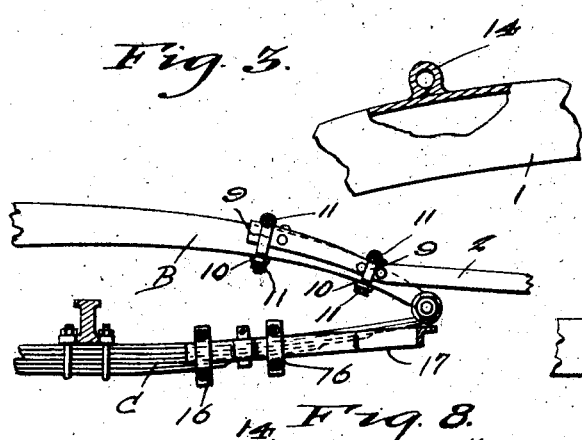
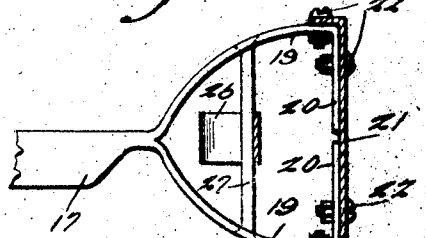
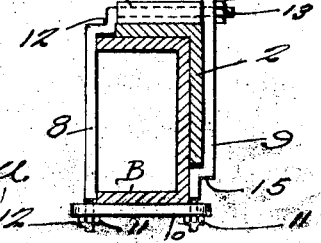
Martin Chick INVENTOR Patented Oct. 6, 1925.

1,556,490

UNITED STATES PATENT OFFICE.

MARTIN CHICK, OF TIRE HILL, PENNSYLVANIA.

BUMPER.

Application filed November 22, 1924. Serial No. 751,685.

*To all whom it may concern:*

Be it known that I, MARTIN CHICK, a citizen of the United States, residing at Tire Hill, in the county of Somerset and State of Pennsylvania, have invented new and useful Improvements in Bumpers, of which the following is a specification.

This invention relates to motor vehicle bumpers and the primary object thereof is to provide a bumper construction that will not only function to relieve the shock of a collision and prevent damage to the collided objects, but will prevent direct contact between the vehicles and objects and thereby cause a glancing blow with minimum shock and damage.

A further object is to provide an automobile bumper construction including side guards adapted for the purpose as above set forth, and to function to allow maximum adequate guiding of the automobile, yet said side guards lie adjacent the front wheels for protection thereof, and for the fenders of the vehicle.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views and in which:

Figure 2 is a top plan view also showing the application of the bumper.

Figure 3 is a fragmentary side elevation showing the securing means of the bumper to the vehicle.

Figure 4 is a sectional view taken on line 4—4 of Figure 1.

Figure 5 is a sectional view taken on line 5—5 of Figure 1.

Figure 6 is a detail view of the front wheel engaging rollers.

Figure 7 is a sectional view taken on line 7—7 of Figure 4.

Figure 8 is a sectional view taken on line 8—8 of Figure 2.

Figure 9 is a detail view of a portion of the frame securing means for the bumper.

Figure 10 is a similar view of another portion.

Figure 1:
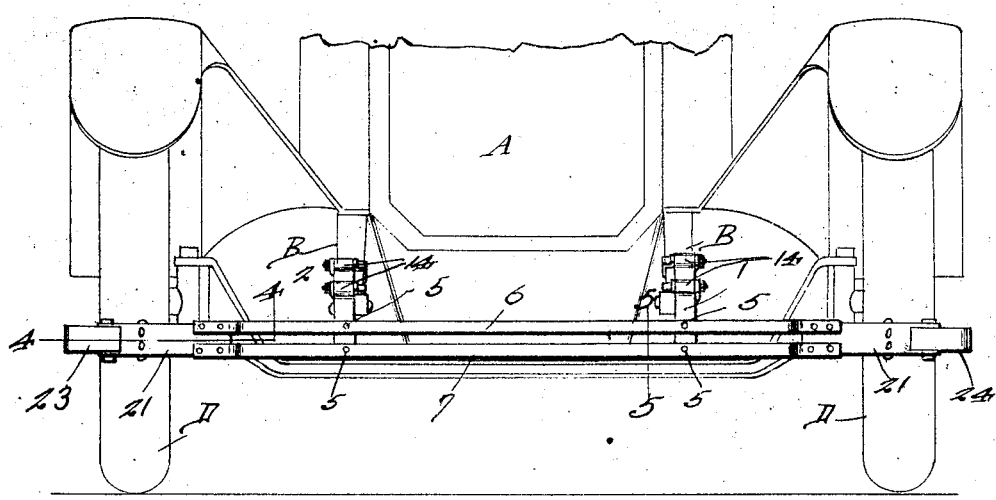
Figure 1 is a fragmentary front elevation of an automobile showing the application of the bumper forming the subject matter of the present invention.
Figure 1:
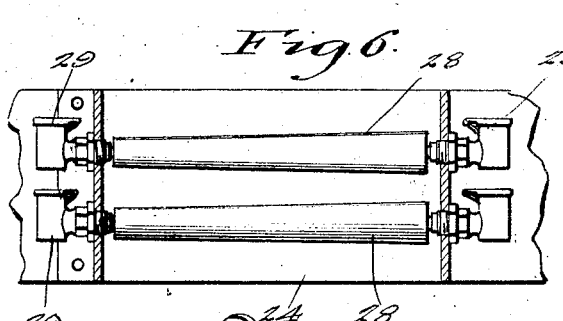
Figure 1:
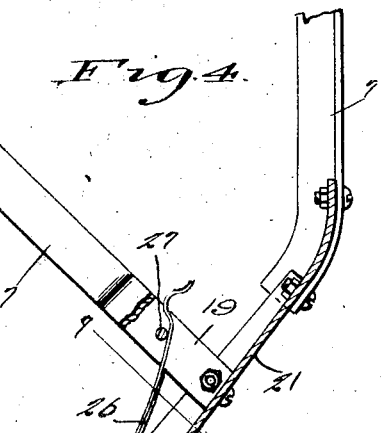
Figure 1:
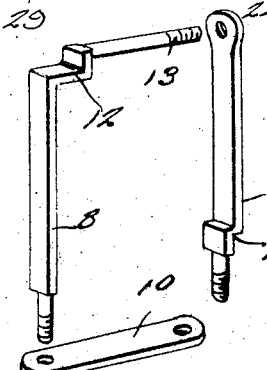
Figure 1:
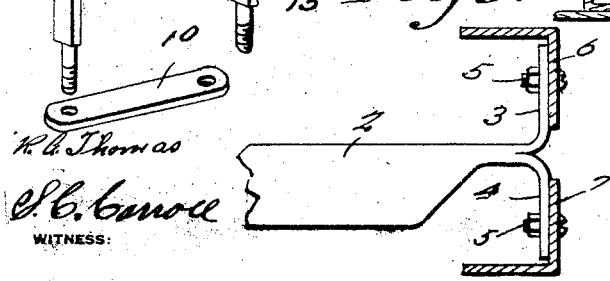

Referring to the drawings in detail the letter A indicates broadly a fragmentary portion of a front of an automobile, B the frame thereof, C the front springs, and D the front wheels.

As shown the frame B has its companion front ends downwardly curved in the usual manner and provided with means of receiving the front end of the springs C. The springs and frame forming the means for supporting the bumper construction will now be described.

Fixed to each end of that portion of the frame shown, there are cross sectional angle shaped arms 1 and 2 which follow the curvature of the frame to a point adjacent the outer ends thereof, and are then bent upwardly to a slight degree. The outer ends of the arms 1 and 2 are reduced and split to form oppositely arranged vertically disposed ears 3 and 4 respectively to which are secured through the medium of a bolt and nut connection 5, a pair of spaced L-section bars 6 and 7 which have their ends bent slightly rearward.

The arms 1 and 2 are secured to the frame ends by means which include shackle members 8 and 9 and a plate 10 all of which are held in operative association through the medium of nuts 11 as clearly shown in Figure 8 of the drawings. The shackle members 8 are each provided with a short right angle bent portion 12 from which extends a shank 13 adapted to pass through sleeves 14 arranged in spaced parallel pairs on each of the arms 1 and 2, one of these sleeves being shown in Figure 3. It should be noted that the right angle bent portion 12 formed on the shackle member 8 is adapted to engage the upper edge of the arms and the shackle member 9 is bent adjacent one end to provide a right angle bent portion 15 to engage the lower edge of the arms 1 and 2 and thereby the right angle bent portions 12 and 15 cooperate to prevent any undue movement of the arms 1 and 2 as will be readily apparent.

Secured to the front spring C through the medium of spring clips 16 are the inner ends of outwardly curved arms 17 and 18 respectively. The outer ends of these arms 17 and 18 are reduced and split to form curved spaced end portions 19 arranged one above the other and which terminate in inwardly extending vertically disposed ears 20 to which are secured the angle bent edges of side plates 21 which have their adjacent ends secured to the ends of the L-section bars 6 and 7 through the medium of the bolt and nut connection 22, as clearly disclosed in Figure 7 of the drawings.

The outer ends of the plates 21 terminate in parallelism with the front wheels and are bifurcated to hingedly receive the guard arms 23 and 24 which extend rearwardly and terminate beyond the hub caps of the wheels as shown, and for the purpose of preventing injury to the hub caps if the arms 23 and 24 should contact therewith, a rubber 25 is secured adjacent the ends of the guard arms. The guard arms are held in operative position as shown through the medium of leaf springs 26 secured to the guard arms and having their free ends engaging a vertical rod 27 extending between the end portions 19 of each arm 17.

Secured to each of the guard arms 23 and 24 are a pair of superimposed parallel arranged rollers 28 disposed in the path of the front wheels whereby when said wheels have turned to direct the vehicle, they will engage the rollers to swing the guard arms on their hinges, thus wear on the tires and arms will be reduced to a minimum.

Oil is supplied to the rollers 28 by oil cups 29 to maintain adequate operation thereof.

The bumper forming the subject matter of the present invention is extremely simple and effectual for the purpose intended, and by providing the guard arms in the manner shown and described, it will be apparent that if two automobiles that are equipped with this bumper should have a side collision, the automobiles glide away from each other by engagement of the side curvature of the bumpers together with the guard arms, with none or little damage, therefore this bumper will protect the vehicles to which it is secured to a maximum.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:

1. A bumper of the character described comprising a pair of L-section bars, means adapted to be secured to the frame of a motor vehicle and extending from the L-section bars, means secured to the ends of the L-section bars, and arms extending from said last mentioned means and secured to the springs of the motor vehicle.

2. The combination with an automobile, of a bumper therefor, comprising a pair of L-section bars, arms extending therefrom and securing said bars to the frame of the automobile, plates secured to the ends of the L-section bars, and hinged guard arms secured to the plates as and for the purpose specified.

3. In combination with an automobile, of a bumper therefor comprising a pair of L-section bars, cross sectionally angle shaped arms securing said L-section bars to the frame of the automobile, plates secured to the ends of the L-section bars, and extending therefrom in a rearward direction, guard arms hingedly secured to the ends of the plates and extending rearwardly to terminate in spaced relation with the hub cap of the front wheels of the automobile, springs for retaining said guard arms in operative position, and a bumper secured adjacent the free ends of the guard arms as and for the purpose specified.

In testimony whereof I affix my signature.

MARTIN CHICK.